(12) United States Patent
Zhang et al.

(10) Patent No.: US 10,075,689 B2
(45) Date of Patent: Sep. 11, 2018

(54) REGION-OF-INTEREST BASED 3D VIDEO CODING

(75) Inventors: Wenhao Zhang, Beijing (CN); Yi-Jen Chiu, San Jose, CA (US); Lidong Xu, Beijing (CN); Yu Han, Beijing (CN); Zhipin Deng, Beijing (CN); Xiaoxia Cai, Beijing (CN)

(73) Assignee: Intel Corporation, Santa Clara, CA (US)

( * ) Notice: Subject to any disclaimer, the term of this patent is extended or adjusted under 35 U.S.C. 154(b) by 874 days.

(21) Appl. No.: 13/977,368

(22) PCT Filed: Jul. 4, 2012

(86) PCT No.: PCT/CN2012/078177
§ 371 (c)(1),
(2), (4) Date: Oct. 8, 2013

(87) PCT Pub. No.: WO2014/005301
PCT Pub. Date: Jan. 9, 2014

(65) Prior Publication Data
US 2016/0212405 A1    Jul. 21, 2016

(51) Int. Cl.
| | |
|---|---|
| *H04N 13/00* | (2018.01) |
| *H04N 19/597* | (2014.01) |
| *H04N 19/119* | (2014.01) |
| *H04N 19/17* | (2014.01) |
| *H04N 19/167* | (2014.01) |
| *H04N 19/70* | (2014.01) |
| *H04N 13/02* | (2006.01) |

(52) U.S. Cl.
CPC ..... *H04N 13/0048* (2013.01); *H04N 13/0022* (2013.01); *H04N 13/0271* (2013.01); *H04N 19/119* (2014.11); *H04N 19/167* (2014.11); *H04N 19/17* (2014.11); *H04N 19/597* (2014.11); *H04N 19/70* (2014.11); *H04N 2213/003* (2013.01)

(58) Field of Classification Search
CPC .................................................. H04N 19/167
See application file for complete search history.

(56) References Cited

U.S. PATENT DOCUMENTS

| | | | |
|---|---|---|---|
| 2006/0017835 A1* | 1/2006 | Jacobsen | H04N 19/115 348/345 |
| 2008/0152245 A1* | 6/2008 | El-Maleh | H04N 21/4621 382/254 |

(Continued)

FOREIGN PATENT DOCUMENTS

| | | |
|---|---|---|
| CN | 101483788 A | 7/2009 |
| CN | 101986713 A | 3/2011 |
| CN | 102158712 A | 8/2011 |

(Continued)

OTHER PUBLICATIONS

Yu-Hsun Lin and Ja-Ling, Fellow, IEEE; A Depth Information Based Fast Mode Decision Algorithm for Color Plus Depth-Map 3D Videos; Jun. 2011.*

(Continued)

*Primary Examiner* — Hesham Abouzahra
(74) *Attorney, Agent, or Firm* — Jordan IP Law, LLC

(57) ABSTRACT

Systems, apparatus, articles, and methods are described including operations for region-of-interest based 3D video coding.

23 Claims, 8 Drawing Sheets

(56) References Cited

U.S. PATENT DOCUMENTS

2009/0297061 A1 12/2009 Mareachen et al.
2011/0007131 A1 1/2011 Okada et al.

FOREIGN PATENT DOCUMENTS

| | | |
|---|---|---|
| EP | 1947609 A1 | 7/2008 |
| JP | 2006095299 A | 10/2006 |
| JP | 2008514115 A | 5/2008 |

OTHER PUBLICATIONS

Yun Zhang, Gangyi Jianga, Mei Yu, You Yang, Zongju Peng, Ken Chen; Depth perceptual region-of-interest based multiview video coding; Mar. 15, 2010; ScienceDirect.*
International Search Report and Written Opinion received for PCT Patent Application No. PCT/CN2012/078177, dated Apr. 11, 2013, 12 Pages.
Notice of Reasons for Rejection for Japanese Patent Application No. 2015-518773, dated Feb. 2, 2016, 3 pages.
Thomas Davies, "BBC's Response to the Call for Proposals on Video Compression Technology", Joint Collaborative Team on Video Coding (JCT-VC) of ITU-T SG16 WP3 and ISO/IEC JTC1/SC29/WG11, Document: JCTVC-A125, http://phenix.it-sudparis.eudct/doc_end_user/documents/1_Dresden/wg11/JCTVC-A125.zip, Mar. 19, 2012, 31 pages.
Toshiyasu Sugio, et.aL, "Modified derivation process on motion vector predictor and weighted prediction for Hevc multi-view extension", Joint Collaborative Team on Video Coding (JCT-VC) of ITU-T SG 16 WP 3 and ISO/IEC JTC 1/ SC 29/WG 11, Document: JCTVC-10436 _r1 (version 3), Apr. 28, 2012, 17 pages.
Extended European Search Report for European Patent Application No. EP12880335, dated Feb. 8, 2016, 8 pages.
Yu-Hsun Lin et al., "A Depth Information Based Fast Mode Decision Algorithm for Color Plus Depth-Map 3D Videos", IEEE Transactiongs on Broadcasting, IEEE Service Center, Piscataway, NJ, US, vol. 57, No. 2, Jun. 1, 2011, 8 pages.
y. Zhang et al., "Depth Perceptual Region-of-interest Based Multiview Video Coding", Journal of Visual Communication and Image Representation, Academic Press, Inc., US, vol. 21, No. 5-6, Jul. 1, 2010, 15 pages.
Official Letter for Chinese Patent Application No. 201280073710.6, dated Jan. 11, 2017, 24 pages.
European Examination Report for European Patent Application No. 12880335.0, dated Jun. 30, 2017, 6 pages.

* cited by examiner

REGION-OF-INTEREST BASED 3D VIDEO CODING

BACKGROUND

A video encoder compresses video information so that more information can be sent over a given bandwidth. The compressed signal may then be transmitted to a receiver that decodes or decompresses the signal prior to display.

3D video has become an emerging medium that can offer a richer visual experience than traditional 2D video. Potential applications include free-viewpoint video (FVV), free-viewpoint television (FTV), 3D television (3DTV), IMAX theaters, immersive teleconferences, surveillance, etc. To support these applications, video systems typically capture a scene from different viewpoints, which results in generating several video sequences from different cameras simultaneously.

3D Video Coding (3DVC) refers to a new video compress standard that targets serving a variety of 3D displays. 3DVC is under development by the ISO/IEC Moving Picture Experts Group (MPEG). At present, one of the branches of 3DVC is built based on the latest conventional video coding standard, High Efficient Video Coding (HEVC), which is planned to be finalized by the end of 2012. The other branch of 3DVC is built based on the H.264/AVC.

The ISO/IEC Moving Picture Experts Group (MPEG) is now undertaking the standardization of 3D Video Coding (3DVC). The new 3DVC standard will likely enable the generation of many high-quality views from a limited amount of input data. For example, a Multiview Video plus Depth (MVD) concept may be used to generate such high-quality views from a limited amount of input data. Further, 3DVC may be utilized for advanced stereoscopic processing functionality and to support auto-stereoscopic display and FTV that allows users to have a 3D visual experience while freely changing their position in front of a 3D display.

The Multiview Video plus Depth (MVD) concept is often used to represent the 3D video content, in which a number of views and associated depth maps are typically coded and multiplexed into a bitstream. Camera parameters of each view are also typically packed into the bitstream for the purpose of view synthesis. One of the views, which are also typically referred to as the base view or the independent view, is typically coded independently of the other views. For the dependent views, video and depth can be predicted from the pictures of other views or previously coded pictures in the same view. According to the specific application, sub-bitstreams can be extracted at the decoder side by discarding non-required bitstream packets.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
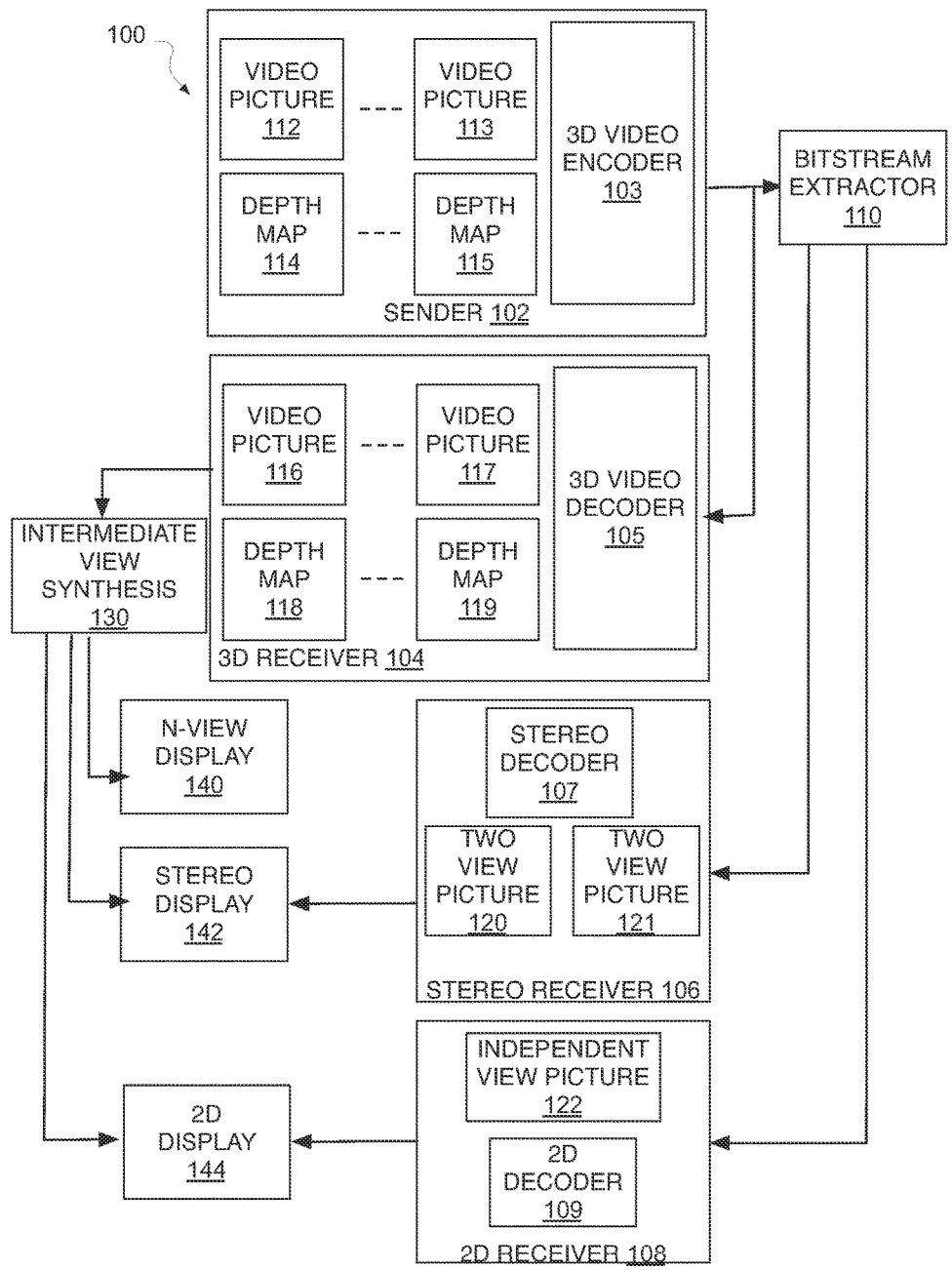
FIG. 1 is an illustrative diagram of an example 3D video coding system.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to effect such feature, structure, or characteristic in connection with other implementations whether or not explicitly described herein.

Systems, apparatus, articles, and methods are described below including operations for region-of-interest based 3D video coding.

As described above, in some cases, in conventional 3D video compression coding, two or three views and associated depth maps may be coded in a bitstream to support various 3D video applications. At the decoder side, virtual synthesized views at a certain view point can be generated by using the depth image based rendering techniques. However, a huge amount of 3D video data surges the required bandwidth in comparison with single view videos. Hence, 3D video data may need to be compressed more efficiently. According to the properties of the human vision system, users may be more sensitive to an interesting region of a picture, such as the foreground, a brighter area, etc. However, in conventional 3D video compression coding does not take advantage of the tendency of the human vision system being more sensitive to interesting regions of a picture to more efficiently compress 3D video.

As will be described in greater detail below, operations for 3D video coding may extract region-of-interest and region-of-noninterest areas and then code such varying regions in different ways in order to achieve higher compression performance. In such a region-of-interest based 3D video coding framework, after partitioning, a picture into several region-of-interest and region-of-non-interest areas by using the depth map and camera parameters, different coding settings may be utilized to compress different regions. Such a region-of-interest based 3D video coding framework can improve the coding efficiency and flexibility of the 3D video coding systems and methods.

FIG. 1 is an illustrative diagram of an example 3D video coding system 100, arranged in accordance with at least some implementations of the present disclosure. In the illustrated implementation, 3D video coding system 100 may include one or more types of displays (e.g., an N-view display 140, a stereo display 142, a 2D display 144, or the like), one or more imaging devices (not shown), a 3D video encoder 103, a 3D video decoder 105, a stereo video decoder 107, a 2D video decoder 109, and/or a bitstream extractor 110.

In some examples, 3D video coding system 100 may include additional items that have not been shown in FIG. 1 for the sake of clarity. For example, 3D video coding system 100 may include a processor, a radio frequency-type (RF) transceiver, and/or an antenna. Further, 3D video coding system 100 may include additional items such as a speaker, a microphone, an accelerometer, memory, a router, network interface logic, etc. that have not been shown in FIG. 1 for the sake of clarity.

As used herein, the term "coder" may refer to an encoder and/or a decoder. Similarly, as used herein, the term "coding" may refer to encoding via an encoder and/or decoding via a decoder. For example 3D video encoder 103 and 3D video decoder 105 may both be examples of coders capable of 3D coding.

In some examples, a sender 102 may receive multiple views from multiple imaging devices (not shown). The input signal for 3D encoder 103 may include multiple views (e.g., video pictures 112 and 113), associated depth maps (e.g., depth maps 114 and 115), and corresponding camera parameters (not shown). However, 3D video coding system 100 can also be operated without depth data. The input component signals are coded into a bitstream using 3D video encoder 103, in which the base view may be coded using a 2D video encoder, e.g. H264/AVC encoder or High Efficiency Video Coding (HEVC) encoder. If the bitstream from bitstream extractor 110 is decoded by a 3D receiver 104 using 3D video decoder 105, videos (e.g., video pictures 116 and 117), depth data (e.g., depth maps 118 and 119), and/or camera parameters (not shown) may be reconstructed with the given fidelity.

In other examples, if the bitstream from bitstream extractor 110 is decoded by a stereo receiver 106 for displaying the 3D video on an auto stereoscopic display (e.g., stereo display 142), additional intermediate views (e.g., two view pictures 120 and 121) may be generated by a depth-image-based rendering (DIBR) algorithm using the reconstructed views and depth data. If 3D video decoder 103 is connected to a conventional stereo display (e.g., stereo display 142), intermediate view synthesis 130 may also generate a pair of stereo views, in case such a pair is not actually present in the bitstream from bitstream extractor 110.

In further examples, if the bitstream from bitstream extractor 110 is decoded by a 2D receiver 108, one of the decoded views (e.g., independent view picture 122) or an intermediate view at an arbitrary virtual camera position can also be used for displaying a single view on a conventional 2D display (e.g., 2D display 144).

As will be discussed in greater detail below, 3D video coding system 100 may be used to perform some or all of the various functions discussed below in connection with FIGS. 3 and/or 4.

Figure 2:
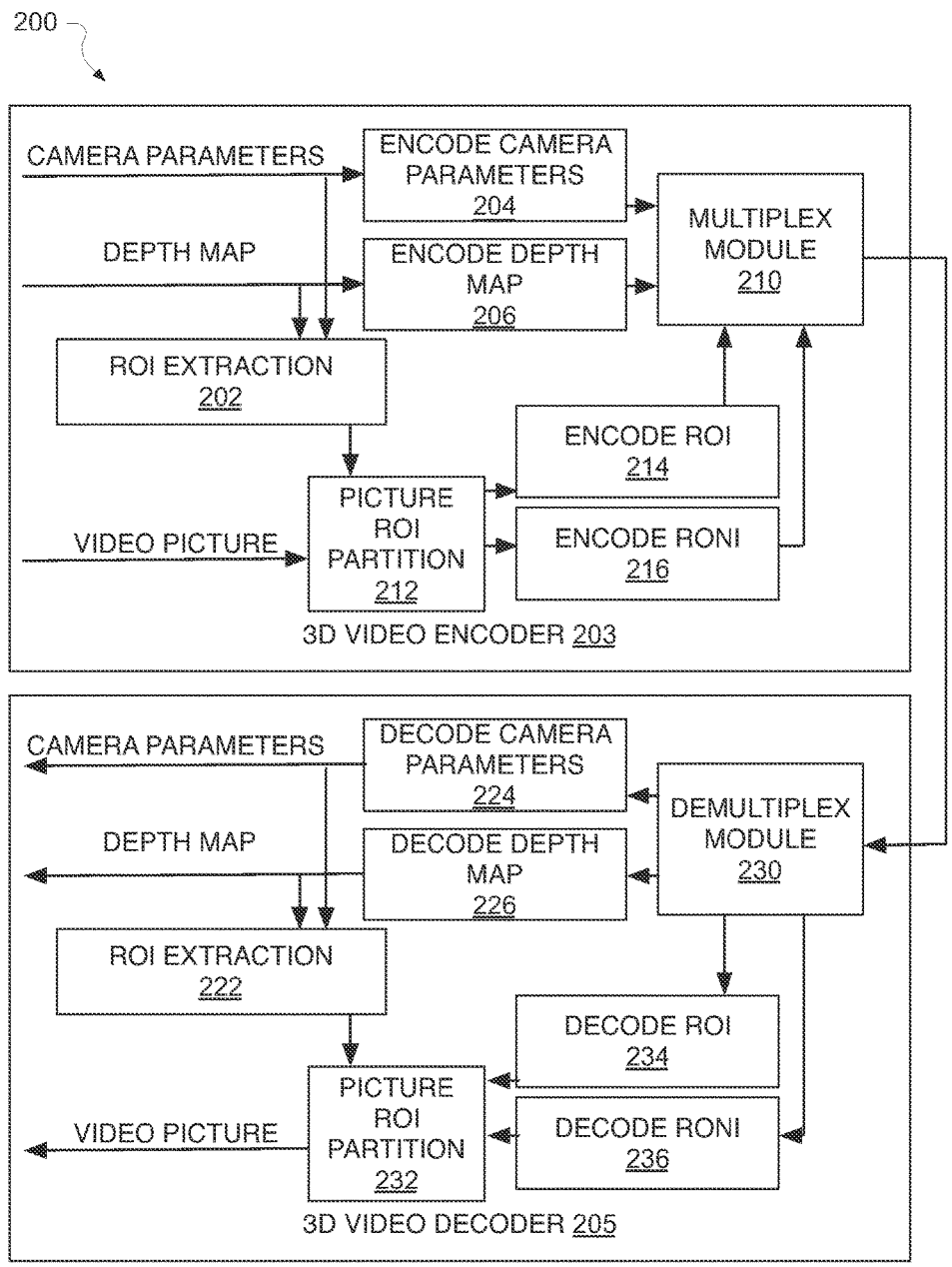
FIG. 2 is an illustrative diagram of an example 3D video coding system.

FIG. 2 is an illustrative diagram of an example 3D video coding system 200, arranged in accordance with at least some implementations of the present disclosure. In the illustrated implementation, 3D video coding system 200 may include a 3D encoder 203 and/or a 3D decoder 205. Further, 3D video coding system 200 may include additional items that have not been shown in FIG. 2 for the sake of clarity.

The input signal for 3D encoder 203 may include multiple views (e.g., video pictures), associated depth maps, and corresponding camera parameters. A region-of-interest (ROI) extraction logic module 202 may be configured to extract a region-of-interest pattern for a video picture, where the region-of-interest pattern is extracted based at least in part on one or more camera parameters and a depth map associated with the video picture.

A picture region-of-interest (ROI) partition logic module 212 may be communicatively coupled to region-of-interest extraction logic module 202. Picture region-of-interest partition logic module 212 may be configured to partition the video picture based at least in part on the extracted region-of-interest pattern. The partitioned video picture may include one or more regions-of-interest picture portions and one or more regions-of-non-interest picture portions. The partitioning of the video picture, during encoding, may involve splitting the video picture into one or more regions-of-interest picture portions and one or more regions-of-non-interest picture portions based at least in part on the region-of-interest pattern.

3D encoder 203 may code the one or more regions-of-interest picture portion 214, the one or more regions-of-noninterest picture portion 216, associated depth maps 206, and corresponding camera parameters 204 and multiplexed into a bitstream at module 210.

3D decoder 205 may demultiplex the bitstream at module 230 and decode the one or more regions-of-interest picture portion 234, the one or more regions-of-non-interest picture portion 236, associated depth maps 226, and corresponding camera parameters 224.

A region-of-interest (ROI) extraction logic module 222 may be configured to extract the region-of-interest pattern for the video picture based at least in part on one or more camera parameters 224 and depth maps 226 associated with the video picture.

A picture region-of-interest (ROI) partition logic module 232 may be communicatively coupled to region-of-interest extraction logic module 222. Picture region-of-interest partition logic module 232 may be configured to partition the video picture based at least in part on the extracted region-of-interest pattern. The partitioned video picture may include one or more regions-of-interest picture portions and one or more regions-of-non-interest picture portions. The partitioning of the video picture, during decoding, may involve assembling the video picture from one or more regions-of-interest picture portions and one or more regions-of-non-interest picture portions.

In operation, 3D video coding system 200 may implement operations for 3D video coding including depth based region-of-interest extraction. As will be described in greater detail below, such depth based region-of-interest extraction may operate in a 3DVC framework. The presented 3DVC framework may take into account the human vision system (HVS) typically being more sensitive to a given the region-of-interest (ROI) of a picture, but less sensitive to a region-of-non-interest (RONI) of the picture. The picture of a view can be partitioned into ROI and RONI and then coded in different ways. The ROI and RONI may be extracted based on the depth map and camera parameters, which corresponds to the current coding view.

At the 3D encoder 203 side, the region partitioning pattern may be derived by using the depth map and camera parameters. Then the picture may be partitioned into ROI and RONI, which can be compressed by using different coding settings. Meanwhile, the depth map and camera parameters also may be compressed. At last, the encoded data of ROI, RONI, depth map and camera parameters may be packaged into a bitstream and transmitted to 3D decoder 205.

At 3D decoder 205 side, the data of ROI, RONI, depth map, and camera parameters may be firstly extracted from the bitstream. Then the depth map and camera parameters may be decoded and reconstructed. After that, the region partitioning pattern may be derived by using the reconstructed depth map and camera parameters in the same or similar manner as done by 3D encoder 203. The ROI picture portions and RONI picture portions may be decoded separately and assembled into the whole picture finally based at least in part on the region partitioning pattern.

As will be discussed in greater detail below, 3D video coding system 200 may be used to perform some or all of the various functions discussed below in connection with FIGS. 3 and/or 4.

Figure 3:
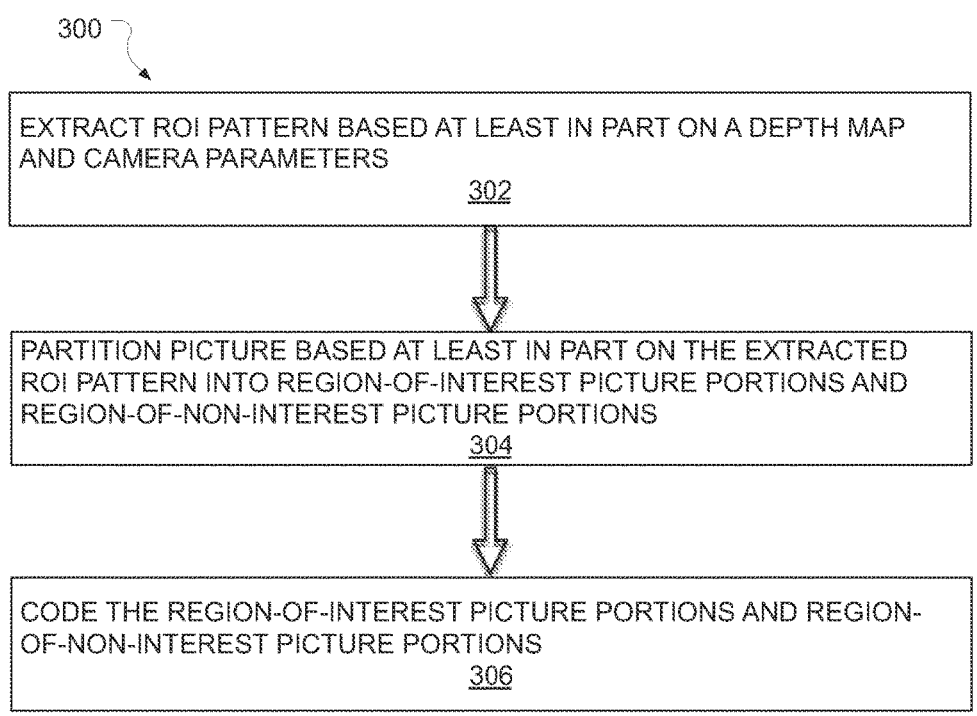
FIG. 3 is a flow chart illustrating an example 3D video coding process.

FIG. 3 is a flow chart illustrating an example 3D video coding process 300, arranged in accordance with at least some implementations of the present disclosure. In the illustrated implementation, process 300 may include one or more operations, functions or actions as illustrated by one or more of blocks 302, 304, and/or 306. By way of non-limiting example, process 300 will be described herein with reference to example 3D video coding system 100 of FIGS. 1, 2 and/or 6.

Process 300 may be utilized as a computer-implemented method for region-of-interest based 3D video coding. Process 300 may begin at block 302, "EXTRACT ROI PATTERN BASED AT LEAST IN PART ON A DEPTH MAP AND CAMERA PARAMETERS", where a region-of-interest pattern may be extracted based at least in part on camera parameters and a depth map. For example, the region-of-interest pattern for a video picture may be extracted based at least in part on one or more camera parameters and a depth map associated with the video picture.

Processing may continue from operation 302 to operation 304, "PARTITION PICTURE BASED AT LEAST IN PART ON THE EXTRACTED ROI PATTERN INTO REGION-OF-INTEREST PICTURE PORTIONS AND REGION-OF-NON-INTEREST PICTURE PORTIONS", where the video picture may be partitioned based at least in part on the extracted region-of-interest pattern. For example, the video picture may be partitioned based at least in part on the extracted region-of-interest pattern into one or more regions-of-interest and one or more regions-of-non-interest.

Processing may continue from operation 304 to operation 306, "CODE THE REGION-OF-INTEREST PICTURE PORTIONS AND REGION-OF-NON-INTEREST PICTURE PORTIONS", where the one or more regions-of-interest and the one or more regions-of-non-interest may be coded. For example, the one or more regions-of-interest and the one or more regions-of-non-interest may be coded during encoding and/or decoding.

In some examples, the partitioning of the video picture, during encoding, may include splitting the video picture into one or more regions-of-interest picture portions and one or more regions-of-non-interest picture portions based at least in part on the region-of-interest pattern. In some examples, the partitioning of the video picture, during decoding, may include assembling the video picture from one or more regions-of-interest picture portions and one or more regions-of-non-interest picture portions.

Some additional and/or alternative details related to process 300 may be illustrated in one or more examples of implementations discussed in greater detail below with regard to FIG. 4.

Figure 4:
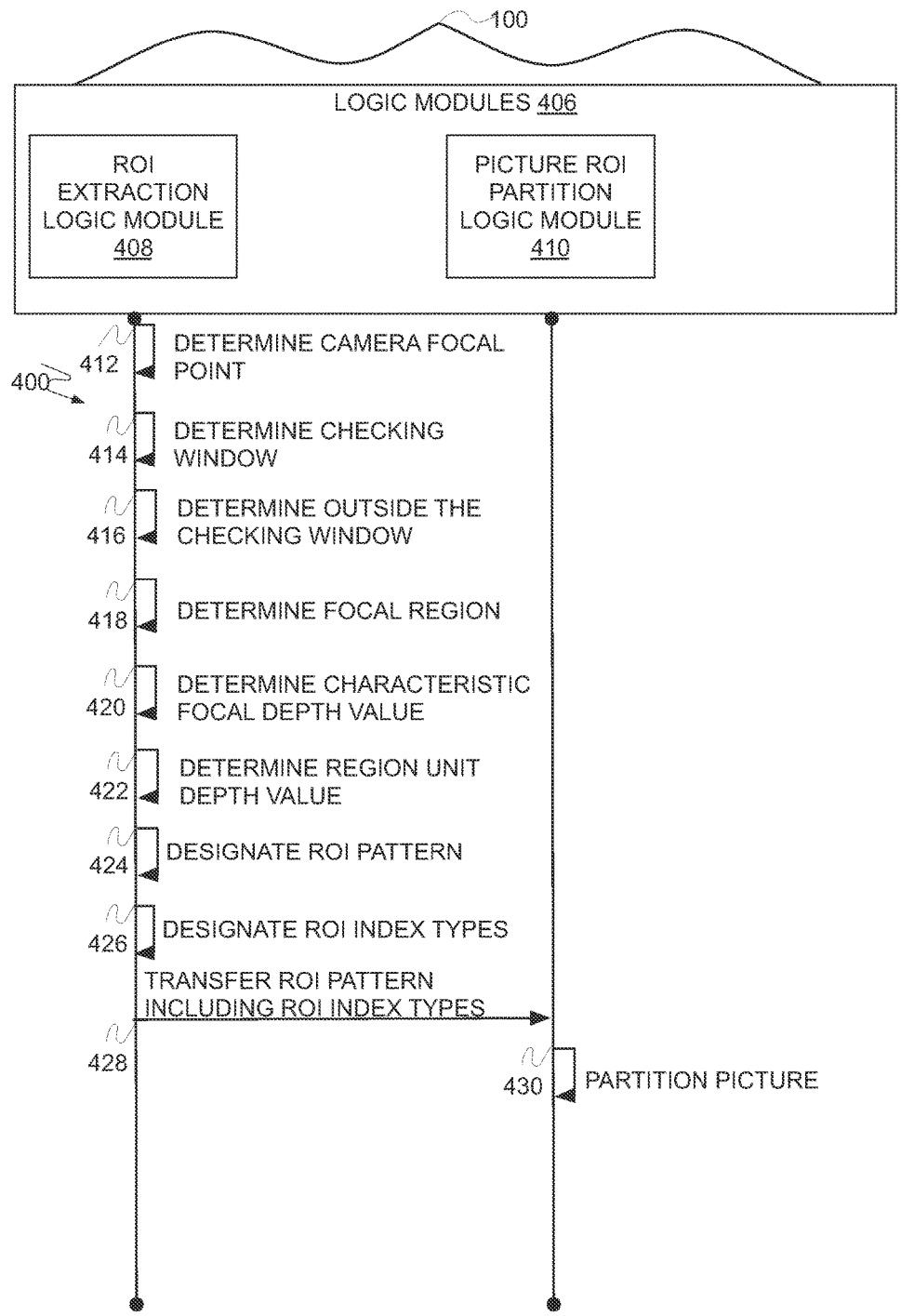
FIG. 4 is an illustrative diagram of an example 3D video coding process in operation.

FIG. 4 is an illustrative diagram of example 3D video coding system 100 and 3D video coding process 400 in operation, arranged in accordance with at least some implementations of the present disclosure. In the illustrated implementation, process 400 may include one or more operations, functions or actions as illustrated by one or more of actions 412, 414, 416, 418, 420, 422, 424, 426, and/or 430. By way of non-limiting example, process 400 will be described herein with reference to example 3D video coding system 100 of FIGS. 1, 2 and/or 5.

In the illustrated implementation, 3D video coding system 100 may include logic modules 406, the like, and/or combinations thereof. For example, logic modules 406, may include ROI extraction logic module 408, picture ROI partition logic module 410, the like, and/or combinations thereof. Although 3D video coding system 100, as shown in FIG. 4, may include one particular set of blocks or actions associated with particular modules, these blocks or actions may be associated with different modules than the particular module illustrated here.

Process 400 may begin at block 412, "DETERMINE CAMERA FOCAL POINT", where a camera focal point may be determined. For example, a camera focal point may be determined based at least in part on the camera parameters.

Although process 400, as illustrated, is directed to decoding, the concepts and/or operations described may be applied in the same or similar manner to coding in general, including in encoding.

Processing may continue from operation 412 to operation 414, "DETERMINE CHECKING WINDOW", where a checking window may be determined. For example, a checking window may be determined associated with a portion of the video picture based at least in part on the camera focal point.

Processing may continue from operation 414 to operation 416, "DETERMINE OUTSIDE THE CHECKING WINDOW", where a determination may be made whether any region unit is located outside the checking window. For example, any region unit located outside the checking window may be designated as being a region-of-non-interest of the region-of-interest pattern.

Processing may continue from operation 416 to operation 418, "DETERMINE FOCAL REGION", where a focal region unit may be determined. For example, a focal region unit may be determined based at least in part on the camera focal point.

Processing may continue from operation 418 to operation 420, "DETERMINE CHARACTERISTIC FOCAL DEPTH VALUE", where a characteristic focal depth value of a focal region unit may be determined. For example, a characteristic focal depth value of the focal region unit may be determined based at least in part on the depth map.

Processing may continue from operation 420 to operation 422, "DETERMINE REGION UNIT DEPTH VALUE", where a region unit depth value may be determined. For example, a region unit depth value for individual region units located within the checking window may be determined.

Processing may continue from operation 422 to operation 424, "DESIGNATE ROI PATTERN", where a region-of-interest pattern may be designated. For example, the region-of-interest pattern for a video picture may be extracted based at least in part on one or more camera parameters and a depth map associated with the video picture. In some examples, any region unit located within the checking window may be designated as being a region-of-interest or a region-of-non-interest of the region-of-interest pattern based at least in part on a comparison of the determined region unit depth values to the characteristic focal depth value.

Processing may continue from operation 424 to operation 426, "DESIGNATE ROI INDEX TYPES", where region-of-interest index types may be designated. For example, region-of-interest region units of the region-of-interest pattern may be further designated as belonging to two or more index types based at least in part on the comparison of the determined region unit depth values to the characteristic focal depth value.

Processing may continue from operation 426 to operation 428, "TRANSFER ROI PATTERN INCLUDING ROT INDEX TYPES", where the region-of-interest pattern may be transferred. For example, the region-of-interest pattern may be transferred from ROI extraction logic module 408 to picture ROI partition logic module 410.

Processing may continue from operation 426 and/or 428 to operation 430, "PARTITION PICTURE", where the video picture may be partitioned. For example, the video picture may be partitioned based at least in part on the extracted region-of-interest pattern into one or more regions-of-interest and one or more regions-of-non-interest.

In operation, ROI partition logic module 410 may be further configured to differentiate between a first type of region unit and a second type of region unit different from the first type. For example, the first and second type of region unit may differ based on one or more of the following criteria: a slice-level criterion, a picture level criterion, a view level criterion, the like, and/or combinations thereof. In such an example, ROI partition logic module 410 may selectively partition the video picture based at least in part on the type of region unit based at least in part on one or more of the following criteria: application of partitioning verses no application of partitioning, application of different region unit sizes, application of different checking window sizes, and application of different thresholds associated with the comparison of the determined region unit depth values to the characteristic focal depth value, the like, and/or combinations thereof.

In some examples, during coding, the one or more regions-of-non-interest picture portions may be coded via a first standard different from a second standard applied to the one or more regions-of-interest picture portions. In such an example, the second standard may include a first sub-standard applied to a first index type of the one or more regions-of-interest picture portions and a second sub-standard applied to a second index type of the one or more regions-of-interest picture portions.

In some examples, the first standard, the second standard, the first sub-standard and/or the second sub-standard may differ based at least in part on one or more of the following criteria: different coding tools, different constraints, different coding strategies, the like, and/or combinations thereof. The different coding tools may differ based at least in part on one or more of the following criteria: application of lossless verses lossy coding to different regions and application of integer motion compensation verses fractional motion compensation to different regions, the like, and/or combinations thereof. The different constraints may differ based at least in part on one or more of the following criteria: application of different reference picture number limitations to different regions and application of different prediction and transform sizes to different regions, the like, and/or combinations thereof. The different coding strategies may differ based at least in part on one or more of the following criteria: application of different search ranges for motion estimation to different regions and application of different quantization parameters to different regions, the like, and/or combinations thereof.

In operation, example processes 300 and 400, as illustrated in FIGS. 3 and 4, may use region unit (RU) to indicate the minimum unit of a picture for partitioning and coding. Firstly, a picture may be divided into RUs, in which each RU contains K×L pixels. Secondly, for each RU, the region partitioning pattern may be determined, such as region type and region index. Note that the ROI may further be split into several sub-ROIs in order to apply finer coding precisions. Suppose a ROI may be separated into N sub-ROIs, RegionType and RegionIdx for each RU may be defined as follows:

1. Where RegionType is equal to 1, this may specify that the current RU may be a ROI. Where RegionType is equal to 0, this may specify that the current RU may be a RONI.

2. RegionIdx may specify the sub-ROI index that a current RU belongs to. When RegionType is equal to 1, the value of RegionIdx may be in the range of 0 to N−1.

In this scheme, depth map and camera parameters may be used to derive the partitioning pattern of RUs. The basic flow may be illustrated as follows:

1. The camera focal point and checking window may be derived. The focal point of camera may be generated by camera parameters such as focal length and camera position. The RU at the focal point may be denoted as RUfocal. Around the focal point, a RU-aligned rectangular checking window can be obtained. RUs located outside the checking window may be all set as RONI. The size of checking window may be predefined, which can be fixed value, or derived at the encoder and then transmitted to the decoder, or adaptively decided by the encoder and the decoder.

2. RUs located inside the checking window may be further processed in the following steps. For each RU in the checking window, a characteristic depth value may be derived. For a RU with size equal to K×L, its corresponding depth block with size equal to K'×L' can be found from the depth map. A characteristic depth value may be derived for each RU and denoted as depth(RU). A variety of methods can be used to derive characteristic depth value, for example, average value of the K'×L' depth block, median value of the K'×L' depth block, the like, and/or combinations thereof. When the depth map data for the current picture may be not available, the estimated depth data can also be utilized to deduce characteristic depth value.

3. A RegionType for each RU in the checking window may be decided. The characteristic depth value of RU may be used to decide if current RU belongs to ROI or RONI. If THlow≤depth(RU)−depth(RUfocal)≤THhigh, then the current RU belongs to ROI and its RegionType may be set to 1. If depth(RU)−depth(RUfocal)<THlow or depth(RU)−depth(RUfocal)>THhigh, then the current RU belongs to RONI and its RegionType may be set to 0. Here two threshold values, THlow and THhigh, may be used to control the range of ROI and RONI. THlow and THhigh may be predefined, which can be fixed values, or derived at the encoder and then transmitted to the decoder, or adaptively decided by the encoder and the decoder.

4. A RegionIdx may be decided for each RU in the checking window. In order to further split the ROI, the range [THlow, THhigh] can be divided in to N intervals. If depth(RU)−depth(RUfocal) may be in the $i^{th}$ interval, the current RU belongs to the $i^{th}$ sub-ROI and its RegionIdx may be set to i. Here the interval pattern of [THlow, THhigh] may be used to control the range of each finer sub-ROI. The interval pattern may be predefined, which can be fixed values, or derived at the encoder and then transmitted to the decoder, or adaptively decided by the encoder and the decoder.

While implementation of example processes 300 and 400, as illustrated in FIGS. 3 and 4, may include the undertaking of all blocks shown in the order illustrated, the present disclosure is not limited in this regard and, in various examples, implementation of processes 300 and 400 may include the undertaking only a subset of the blocks shown and/or in a different order than illustrated.

In addition, any one or more of the blocks of FIGS. 3 and 4 may be undertaken in response to instructions provided by one or more computer program products. Such program products may include signal bearing media providing instructions that, when executed by, for example, a processor, may provide the functionality described herein. The computer program products may be provided in any form of computer readable medium. Thus, for example, a processor including one or more processor core(s) may undertake one or more of the blocks shown in FIGS. 3 and 4 in response to instructions conveyed to the processor by a computer readable medium.

As used in any implementation described herein, the term "module" refers to any combination of software, firmware and/or hardware configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 5:
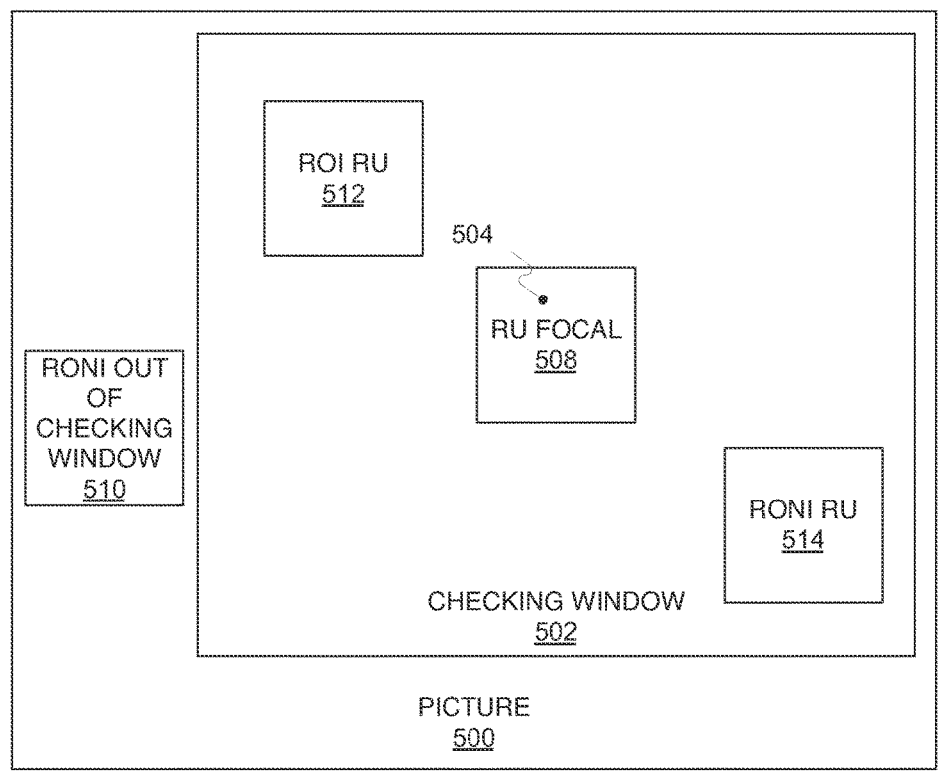
FIG. 5 is an illustrative diagram of example region-of-interest extraction.

FIG. 5 is an illustrative diagram of example region-of-interest extraction in accordance with at least some implementations of the present disclosure. In the illustrated implementation, an example of ROI and RONI extraction is illustrated, in which one ROI and one RONI are used for coding a picture 500. Four region units (RUs), RU focal 508, RONI out of checking window RU 510, ROI RU 512, and RONI RU 514, are shown to illustrate the process of extraction. RU focal 508 is the RUfocal, which is the center of checking window. Because, RONI out of checking window RU 510 locates out of the checking window 502, RU 510 is set as part of RONI. For ROI RU 512 and RUNI RU 514, their depth information may be checked against RU focal 508 to see if the extraction rule is fulfilled. As a result, RU 512 and RU 514 are may be set as ROI and RONI, respectively.

For example, after the ROI picture portions and RONI picture portions are extracted from a picture, different coding settings can be applied to ROI picture portions as compared to RONI picture portions. The different coding settings may include, but are not limited to, using different coding tools, using different constraints, using different encoding strategies, the like, and/or combinations thereof. For example, such different coding tools may include applying lossless coding tools to regions like ROI and lossy coding tools to other regions like RONI (and/or different sub-regions-of-interest). In another example, such different coding tools may include applying different motion vector resolution for compensation to different regions (and/or different sub-regions-of-interest). For example, such different constraints may include applying different reference picture number limitations to different regions (and/or different sub-regions-of-interest). In another example, different constraints may include applying different prediction and transform sizes to different regions (and/or different sub-regions-of-interest). For example, such different encoding strategies may include applying different search ranges for motion estimation to different regions (and/or different sub-regions-of-interest). In another example, such different encoding strategies may include applying different Quantization Parameter (QP) values to different regions (and/or different sub-regions-of-interest).

Figure 6:
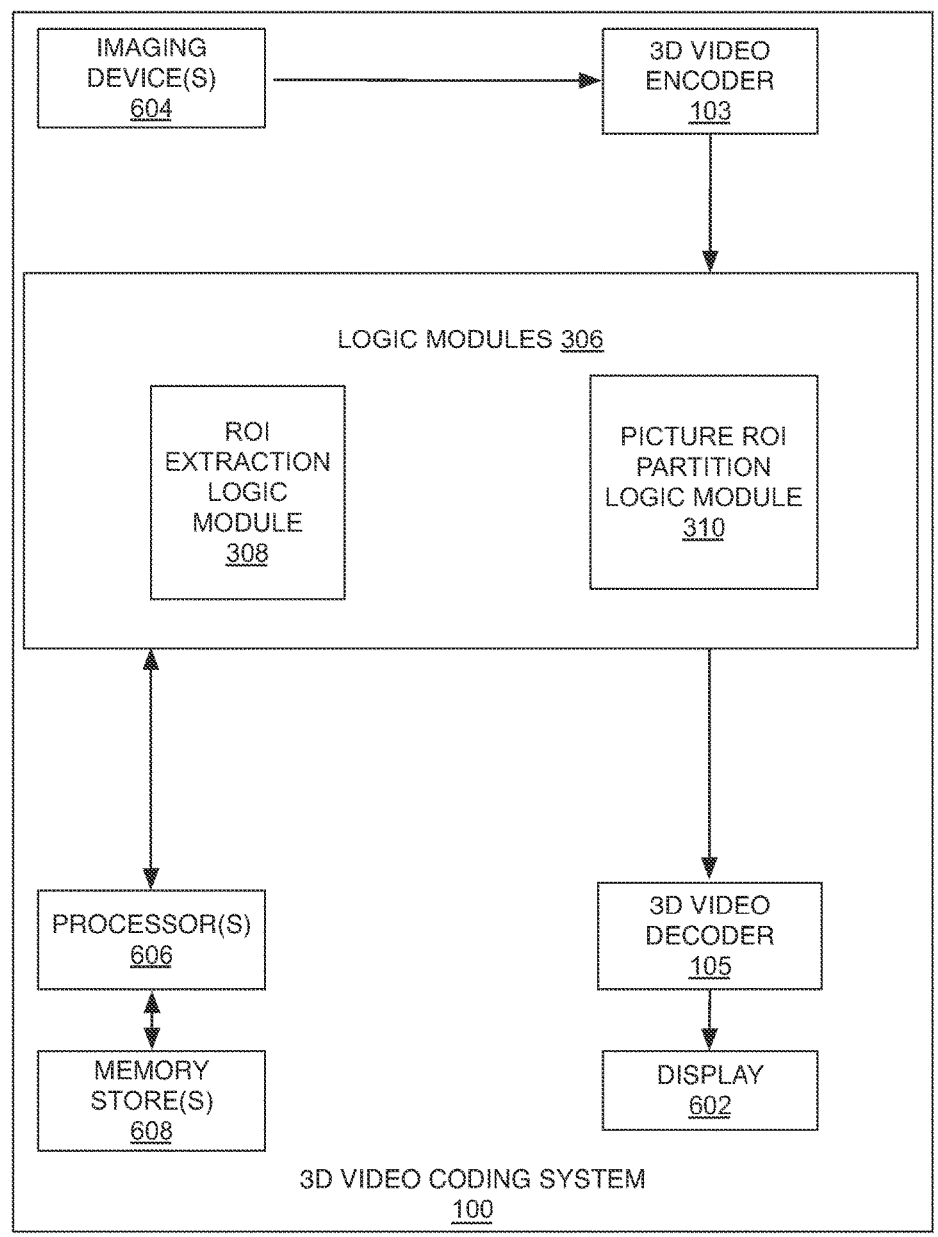
FIG. 6 is an illustrative diagram of an example 3D video coding system.

FIG. 6 is an illustrative diagram of an example 3D video coding system 100, arranged in accordance with at least some implementations of the present disclosure. In the illustrated implementation, 3D video coding system 100 may include display 602, imaging device(s) 604, 3D video encoder 103, 3D video decoder 105, and/or logic modules 406. Logic modules 406 may include ROI extraction logic module 408, picture ROI partition logic module 410, the like, and/or combinations thereof.

As illustrated, display 602, 3D video decoder 105, processor 606 and/or memory store 608 may be capable of communication with one another and/or communication with portions of logic modules 406. Similarly, imaging device(s) 604 and 3D video encoder 103 may be capable of communication with one another and/or communication with portions of logic modules 406. Accordingly, 3D video decoder 105 may include all or portions of logic modules 406, while 3D video encoder 103 may include similar logic modules. Although 3D video coding system 100, as shown in FIG. 6, may include one particular set of blocks or actions associated with particular modules, these blocks or actions may be associated with different modules than the particular module illustrated here.

In some examples, display device 602 may be configured to present video data. Processors 606 may be communicatively coupled to display device 602. Memory stores 608 may be communicatively coupled to processors 606. ROI extraction logic module 408 may be communicatively coupled to processors 606 and may be configured to extract a region-of-interest pattern for a video picture, where the region-of-interest pattern is extracted based at least in part on one or more camera parameters and a depth map associated with the video picture. Picture ROI partition logic module 410 may be communicatively coupled to ROI extraction logic module 408 and may be configured to partition the video picture based at least in part on the extracted region-of-interest pattern, where the partitioned video picture may include one or more regions-of-interest and one or more regions-of-non-interest. Coder (e.g., 3D video decoder 105 or 3D video encoder 103) may be communicatively coupled to picture ROI partition logic module 410 and may be configured to code the one or more regions-of-interest and the one or more regions-of-non-interest.

In various embodiments, ROI extraction logic module 408 may be implemented in hardware, while software may implement Picture ROI partition logic module 410. For example, in some embodiments, ROI extraction logic module 408 may be implemented by application-specific integrated circuit (ASIC) logic while Picture ROI partition logic module 410 may be provided by software instructions executed by logic such as processors 606. However, the present disclosure is not limited in this regard and ROI extraction logic module 408 and/or Picture ROI partition logic module 410 may be implemented by any combination of hardware, firmware and/or software. In addition, memory stores 608 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory stores 608 may be implemented by cache memory.

Figure 7:
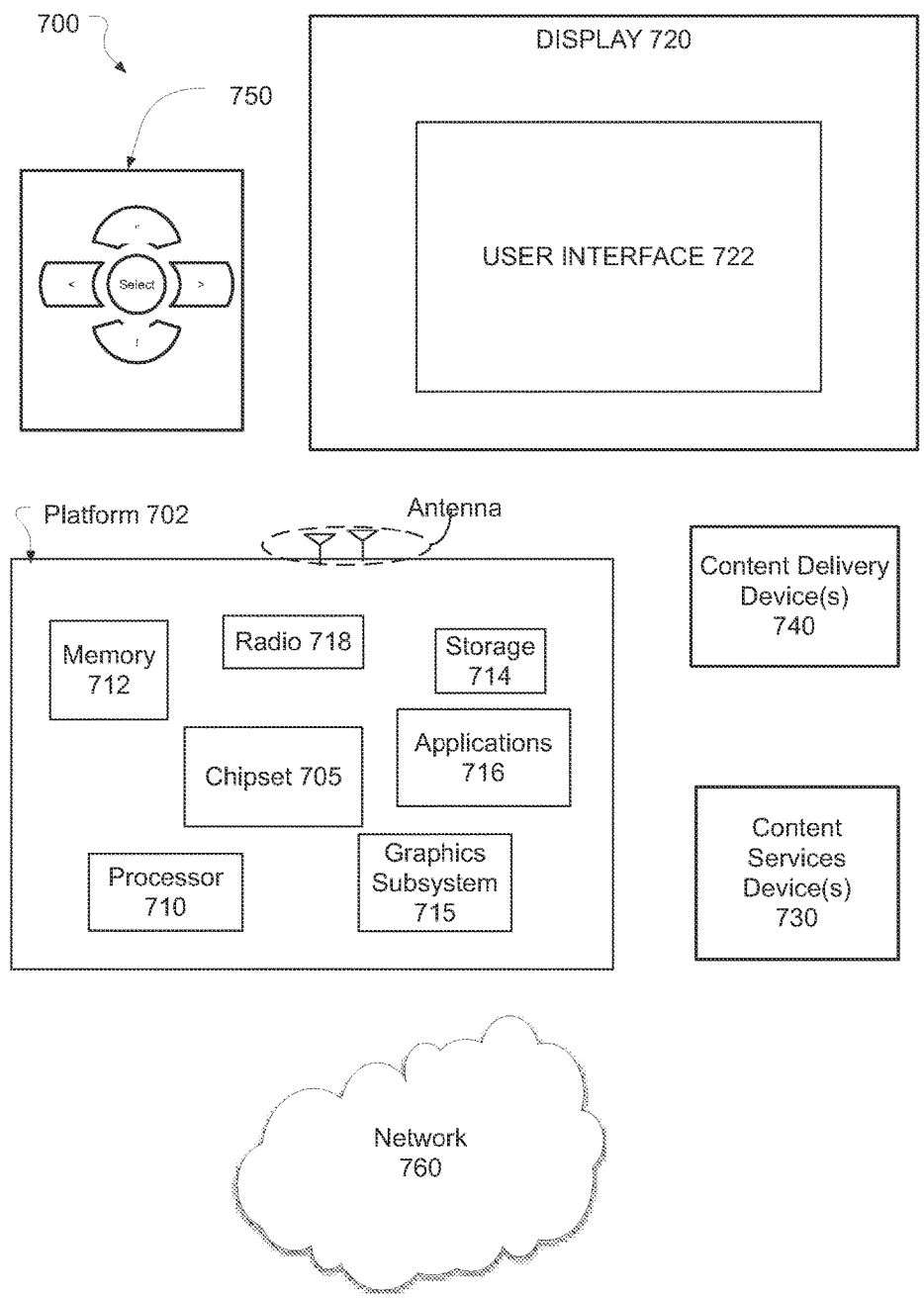
FIG. 7 is an illustrative diagram of an example system.

FIG. 7 illustrates an example system 700 in accordance with the present disclosure. In various implementations, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 700 includes a platform 702 coupled to a display 720. Platform 702 may receive content from a content device such as content services device(s) 730 or content delivery device(s) 740 or other similar content sources. A navigation controller 750 including one or more navigation features may be used to interact with, for example, platform 702 and/or display 720. Each of these components is described in greater detail below.

In various implementations, platform 702 may include any combination of a chipset 705, processor 710, memory 712, storage 714, graphics subsystem 715, applications 716 and/or radio 714, Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

Processor 710 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 710 may be dual-core processor(s), dual-core mobile processor(s), and so forth.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 714 may include technology to increase the storage performance enhanced protection for valuable digital media when multiple hard drives are included, for example.

Graphics subsystem 715 may perform processing of images such as still or video for display, Graphics subsystem 715 may be a graphics processing unit (GPU) or a visual processing unit (VPU), for example. An analog or digital interface may be used to communicatively couple graphics subsystem 715 and display 720. For example, the interface may be any of a High-Definition Multimedia Interface, Display Port, wireless HDMI, and/or wireless HD compliant techniques. Graphics subsystem 715 may be integrated into processor 710 or chipset 705. In some implementations, graphics subsystem 715 may be a stand-alone card communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 718 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In various implementations, display 720 may include any television type monitor or display. Display 720 may include, for example, a computer display screen, touch screen display, video monitor, television-like device, and/or a television. Display 720 may be digital and/or analog. In various implementations, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In various implementations, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In various implementations, content services device(s) 730 may include a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

Content services device(s) 730 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 702 may receive control signals from navigation controller 750 having one or more navigation features. The navigation features of controller 750 may be used to interact with user interface 722, for example. In embodiments, navigation controller 750 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 750 may be replicated on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In embodiments, controller 750 may not be a separate component but may be integrated into platform 702 and/or display 720. The present disclosure, however, is not limited to the elements or in the context shown or described herein.

In various implementations, drivers (not shown) may include technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 even when the platform is turned "off." In addition, chipset 705 may include hardware and/or software support for (6.1) surround sound audio and/or high definition (7.1) surround sound audio, for example. Drivers may include a graphics driver for integrated graphics platforms. In embodiments, the graphics driver may comprise a peripheral component interconnect (PCI) Express graphics card.

In various implementations, any one or more of the components shown in system 600 may be integrated. For example, platform 602 and content services device(s) 630 may be integrated, or platform 602 and content delivery device(s) 640 may be integrated, or platform 602, content services device(s) 630, and content delivery device(s) 640 may be integrated, for example. In various embodiments, platform 602 and display 620 may be an integrated unit. Display 620 and content service device(s) 630 may be integrated, or display 620 and content delivery device(s) 640 may be integrated, for example. These examples are not meant to limit the present disclosure.

In various embodiments, system 600 may be implemented as a wireless system, a wired system, or a combination of both. When implemented as a wireless system, system 600 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 600 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 602 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 6.

Figure 8:
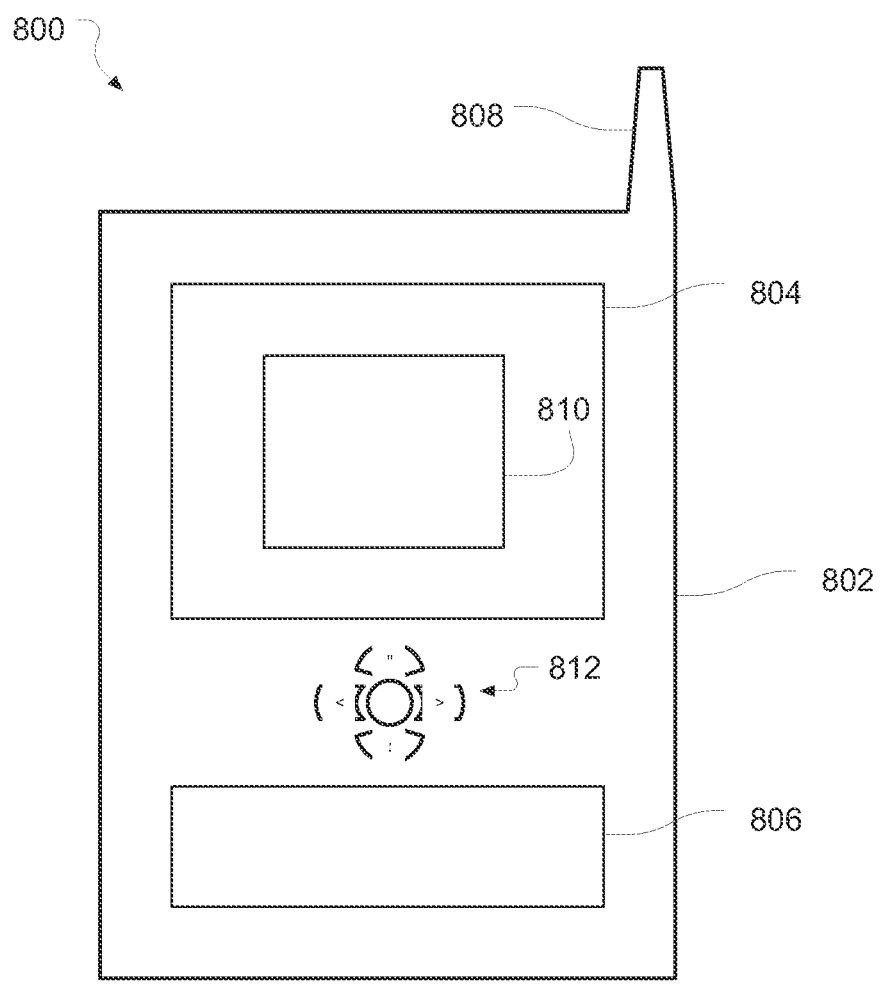
FIG. 8 is an illustrative diagram of an example system, all arranged in accordance with at least some implementations of the present disclosure.

As described above, system 600 may be embodied in varying physical styles or form factors. FIG. 8 illustrates implementations of a small form factor device 800 in which system 600 may be embodied. In embodiments, for example, device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 8, device 800 may include a housing 802, a display 804, an input/output (I/O) device 806, and an antenna 808. Device 800 also may include navigation features 812. Display 804 may include any suitable display unit for displaying information appropriate for a mobile computing device. I/O device 806 may include any suitable I/O device for entering information into a mobile computing device. Examples for I/O device 806 may include an alphanumeric keyboard, a numeric keypad, a touch pad, input keys, buttons, switches, rocker switches, microphones, speakers, voice recognition device and software, and so forth. Information also may be entered into device 800 by way of microphone (not shown). Such information may be digitized by a voice recognition device (not shown). The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further embodiments.

In one example, a computer-implemented method for video coding may include extracting a region-of-interest pattern for a video picture, where the region-of-interest pattern is extracted based at least in part on one or more camera parameters and a depth map associated with the video picture. The video picture may be partitioned based at least in part on the extracted region-of-interest pattern, where the partitioned video picture includes one or more regions-of-interest and one or more regions-of-non-interest. The one or more regions-of-interest and the one or more regions-of-non-interest may be coded.

In another example, a computer-implemented method for video coding may further include the extraction of the region-of-interest pattern may further include: determining a camera focal point based at least in part on the camera parameters, determining a checking window associated with a portion of the video picture based at least in part on the camera focal point, designating any region unit located outside the checking window as being a region-of-non-interest of the region-of-interest pattern, determining a focal region unit based at least in part on the camera focal point, determining a characteristic focal depth value of the a focal region unit based at least in part on the depth map, determining a region unit depth value for individual region units located within the checking window, designating any region unit located within the checking window as being a region-of-interest or a region-of-non-interest of the region-of-interest pattern based at least in part on a comparison of the determined region unit depth values to the characteristic focal depth value, and further designating region-of-interest region units of the region-of-interest pattern as belonging to two or more index types based at least in part on the comparison of the determined region unit depth values to the characteristic focal depth value. The partitioning of the video picture may further include: differentiating between a first type of region unit and a second type of region unit different from the first type, where the first and second type of region unit differ base on one or more of the following criteria: a slice-level criterion, a picture level criterion, and a view level criterion; selectively partitioning of the video picture based at least in part on the type of region unit based at least in part on one or more of the following criteria: application of partitioning verses no application of partitioning, application of different region unit sizes, application of different checking window sizes, and application of different thresholds associated with the comparison of the determined region unit depth values to the characteristic focal depth value; and where the partitioning of the video picture, during encoding, includes splitting the video picture into one or more regions-of-interest picture portions and one or more regions-of-non-interest picture portions based at least in part on the region-of-interest pattern; and where the partitioning of the video picture, during decoding, includes assembling the video picture from one or more regions-of-interest picture portions and one or more regions-of-non-interest picture portions. During coding, the one or more regions-of-non-interest picture portions are coded via a first standard different from a second standard applied to the one or more regions-of-interest picture portions, and where the second standard includes a first substandard applied to a first index type of the one or more regions-of-interest picture portions and a second sub-standard applied to a second index type of the one or more regions-of-interest picture portions. The first standard, the second standard, the first sub-standard and/or the second sub-standard differ based at least in part on one or more of the following criteria: different coding tools, different constraints, and different coding strategies; where the different coding tools differ based at least in part on one or more of the following criteria: application of lossless verses lossy coding to different regions and application of integer motion compensation verses fractional motion compensation to different regions; where the different constraints differ based at least in part on one or more of the following criteria: application of different reference picture number limitations to different regions and application of different prediction and transform sizes to different regions; and where the different coding strategies differ based at least in part on one or more of the following criteria: application of different search ranges for motion estimation to different regions and application of different quantization parameters to different regions.

In other examples, a system for video coding on a computer may include a display device, one or more processors, one or more memory stores, a region-of-interest extraction logic module, a picture region-of-interest partition logic module, the like, and/or combinations thereof. The display device may be configured to present video data. The one or more processors may be communicatively coupled to the display device. The region-of-interest extraction may be communicatively coupled to the one or more processors. The region-of-interest extraction logic module may be configured to extract a region-of-interest pattern for a video picture, where the region-of-interest pattern is extracted based at least in part on one or more camera parameters and a depth map associated with the video picture. The picture region-of-interest partition logic module may be communicatively coupled to the region-of-interest extraction logic module. The picture region-of-interest partition logic module may be configured to partition the video picture based at least in part on the extracted region-of-interest pattern, where the partitioned video picture may include one or more regions-of-interest and one or more regions-of-non-interest. The coder may be communicatively coupled to the picture region-of-interest partition logic module. The coder may be configured to code the one or more regions-of-interest and the one or more regions-of-non-interest.

In another example, the system for video coding on a computer where the extraction of the region-of-interest pattern logic module may be further configured to: determine a camera focal point based at least in part on the camera parameters; determine a checking window associated with a portion of the video picture based at least in part on the camera focal point; designate any region unit located outside the checking window as being a region-of-non-interest of the region-of-interest pattern; determine a focal region unit based at least in part on the camera focal point; determine a characteristic focal depth value of the a focal region unit based at least in part on the depth map; determine a region unit depth value for individual region units located within the checking window; designate any region unit located within the checking window as being a region-of-interest or a region-of-non-interest of the region-of-interest pattern based at least in part on a comparison of the determined region unit depth values to the characteristic focal depth value; and further designate region-of-interest region units of the region-of-interest pattern as belonging to two or more index types based at least in part on the comparison of the determined region unit depth values to the characteristic focal depth value. The picture region-of-interest partition logic module may be further configured to: differentiate between a first type of region unit and a second type of region unit different from the first type, where the first and second type of region unit differ base on one or more of the following criteria: a slice-level criterion, a picture level criterion, and a view level criterion; selectively partition the video picture based at least in part on the type of region unit based at least in part on one or more of the following criteria: application of partitioning verses no application of partitioning, application of different region unit sizes, application of different checking window sizes, and application of different thresholds associated with the comparison of the determined region unit depth values to the characteristic focal depth value; and the partitioning of the video picture, during encoding, includes splitting the video picture into one or more regions-of-interest picture portions and one or more regions-of-non-interest picture portions based at least in part on the region-of-interest pattern; and where the partitioning of the video picture, during decoding, includes assembling the video picture from one or more regions-of-interest picture portions and one or more regions-of-non-interest picture portions. During coding, the one or more regions-of-non-interest picture portions are coded via a first standard different from a second standard applied to the one or more regions-of-interest picture portions, and where the second standard includes a first sub-standard applied to a first index type of the one or more regions-of-interest picture portions and a second sub-standard applied to a second index type of the one or more regions-of-interest picture portions. The first standard, the second standard, the first sub-standard and/or the second sub-standard differ based at least in part on one or more of the following criteria: different coding tools, different constraints, and different coding strategies; where the different coding tools differ based at least in part on one or more of the following criteria: application of lossless verses lossy coding to different regions and application of integer motion compensation verses fractional motion compensation to different regions; where the different constraints differ based at least in part on one or more of the following criteria: application of different reference picture number limitations to different regions and application of different prediction and transform sizes to different regions; and where the different coding strategies differ based at least in part on one or more of the following criteria: application of different search ranges for motion estimation to different regions and application of different quantization parameters to different regions.

In a further example, at least one machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, such the above examples are not limited in this regard and, in various implementations, the above examples may include the undertaking only a subset of such features, undertaking a different order of such features, undertaking a different combination of such features, and/or undertaking additional features than those features explicitly listed. For example, all features described with respect to the example methods may be implemented with respect to the example apparatus, the example systems, and/or the example articles, and vice versa.

What is claimed:

1. A computer-implemented method for video coding, comprising:
   extracting a region-of-interest pattern for a video picture, wherein the region-of-interest pattern is extracted based at least in part on a received depth map associated with the video picture and one or more received camera parameters, wherein the extraction of the region-of-interest pattern further comprises:
      determining a camera focal point based at least in part on the camera parameters,
      determining a focal region unit based at least in part on the camera focal point,
      determining a characteristic focal depth value of the a focal region unit based at least in part on the depth map,
      determining a region unit depth value for individual region units, and
      designating any region unit as being a region-of-interest or a region-of-non-interest of the region-of-interest pattern based at least in part on a comparison of the determined region unit depth values to the characteristic focal depth value, wherein the comparison includes comparing a difference between the determined region unit depth values and the characteristic focal depth value associated with the camera focal point to a threshold value;
   partitioning the video picture based at least in part on the extracted region-of-interest pattern, wherein the partitioned video picture comprises one or more regions-of-interest and one or more regions-of-non-interest; and
   coding the one or more regions-of-interest and the one or more regions-of-non-interest.

2. The method of claim 1, wherein the coding of the prediction unit comprises 3D decoding.

3. The method of claim 1, wherein the partitioning of the video picture, during encoding, comprises splitting the video picture into one or more regions-of-interest picture portions and one or more regions-of-non-interest picture portions.

4. The method of claim 1, wherein the partitioning of the video picture, during encoding, comprises assembling the video picture from one or more regions-of-interest picture portions and one or more regions-of-non-interest picture portions.

5. The method of claim 1, wherein the extraction of the region-of-interest pattern further comprises:

determining a checking window associated with a portion of the video picture based at least in part on the camera focal point, and
designating any region unit located outside the checking window as being a region-of-non-interest of the region-of-interest pattern.

6. The method of claim 1, wherein the extraction of the region-of-interest pattern further comprises:
   further designating region-of-interest region units of the region-of-interest pattern as belonging to two or more index types based at least in part on the comparison of the determined region unit depth values to the characteristic focal depth value.

7. The method of claim 1, wherein the extraction of the region-of-interest pattern further comprises:
   determining a checking window associated with a portion of the video picture based at least in part on the camera focal point,
   designating any region unit located outside the checking window as being a region-of-non-interest of the region-of-interest pattern,
   determining the region unit depth value for individual region units located within the checking window,
   designating any region unit located within the checking window as being a region-of-interest or a region-of-non-interest of the region-of-interest pattern based at least in part on the comparison of the determined region unit depth values to the characteristic focal depth value, and
   further designating region-of-interest region units of the region-of-interest pattern as belonging to two or more index types based at least in part on the comparison of the determined region unit depth values to the characteristic focal depth value.

8. The method of claim 1, wherein, during coding, the one or more regions-of-non-interest picture portions are coded via a first standard different from a second standard applied to the one or more regions-of-interest picture portions.

9. The method of claim 1, wherein, during coding, the one or more regions-of-non-interest picture portions are coded via a first standard different from a second standard applied to the one or more regions-of-interest picture portions, and wherein the second standard comprises a first sub-standard applied to a first index type of the one or more regions-of-interest picture portions and a second sub-standard applied to a second index type of the one or more regions-of-interest picture portions; and
   wherein the first standard, the second standard, the first sub-standard and/or the second sub-standard differ based at least in part on one or more of the following criteria: different coding tools, different constraints, and different coding strategies; wherein the different coding tools differ based at least in part on one or more of the following criteria: application of lossless verses lossy coding to different regions and application of integer motion compensation verses fractional motion compensation to different regions; wherein the different constraints differ based at least in part on one or more of the following criteria: application of different reference picture number limitations to different regions and application of different prediction and transform sizes to different regions; and wherein the different coding strategies differ based at least in part on one or more of the following criteria: application of different search ranges for motion estimation to different regions and application of different quantization parameters to different regions.

10. The method of claim 1, further comprising:
differentiating between a first type of region unit and a second type of region unit different from the first type, wherein the first and second type of region unit differ base on one or more of the following criteria: a slice-level criterion, a picture level criterion, and a view level criterion; and
selectively partitioning of the video picture based at least in part on the type of region unit.

11. The method of claim 1, further comprising:
differentiating between a first type of region unit and a second type of region unit different from the first type, wherein the first and second type of region unit differ base on one or more of the following criteria: a slice-level criterion, a picture level criterion, and a view level criterion; and
selectively partitioning of the video picture based at least in part on the type of region unit based at least in part on one or more of the following criteria: application of partitioning verses no application of partitioning, application of different region unit sizes, application of different checking window sizes, and application of different thresholds associated with the comparison of the determined region unit depth values to the characteristic focal depth value.

12. The method of claim 1, further comprising:
wherein the extraction of the region-of-interest pattern further comprises:
determining a checking window associated with a portion of the video picture based at least in part on the camera focal point,
designating any region unit located outside the checking window as being a region-of-non-interest of the region-of-interest pattern,
determining the region unit depth value for individual region units located within the checking window,
designating any region unit located within the checking window as being a region-of-interest or a region-of-non-interest of the region-of-interest pattern based at least in part on the comparison of the determined region unit depth values to the characteristic focal depth value, and
further designating region-of-interest region units of the region-of-interest pattern as belonging to two or more index types based at least in part on the comparison of the determined region unit depth values to the characteristic focal depth value;
wherein the partitioning of the video picture further comprises:
differentiating between a first type of region unit and a second type of region unit different from the first type, wherein the first and second type of region unit differ base on one or more of the following criteria: a slice-level criterion, a picture level criterion, and a view level criterion,
selectively partitioning of the video picture based at least in part on the type of region unit based at least in part on one or more of the following criteria: application of partitioning verses no application of partitioning, application of different region unit sizes, application of different checking window sizes, and application of different thresholds associated with the comparison of the determined region unit depth values to the characteristic focal depth value, and
wherein the partitioning of the video picture, during encoding, comprises splitting the video picture into one or more regions-of-interest picture portions and one or more regions-of-non-interest picture portions based at least in part on the region-of-interest pattern; and wherein the partitioning of the video picture, during decoding, comprises assembling the video picture from one or more regions-of-interest picture portions and one or more regions-of-non-interest picture portions;
wherein, during coding, the one or more regions-of-non-interest picture portions are coded via a first standard different from a second standard applied to the one or more regions-of-interest picture portions, and wherein the second standard comprises a first sub-standard applied to a first index type of the one or more regions-of-interest picture portions and a second sub-standard applied to a second index type of the one or more regions-of-interest picture portions;
wherein the first standard, the second standard, the first sub-standard and/or the second sub-standard differ based at least in part on one or more of the following criteria: different coding tools, different constraints, and different coding strategies; wherein the different coding tools differ based at least in part on one or more of the following criteria: application of lossless verses lossy coding to different regions and application of integer motion compensation verses fractional motion compensation to different regions; wherein the different constraints differ based at least in part on one or more of the following criteria: application of different reference picture number limitations to different regions and application of different prediction and transform sizes to different regions; and wherein the different coding strategies differ based at least in part on one or more of the following criteria: application of different search ranges for motion estimation to different regions and application of different quantization parameters to different regions.

13. A system for video coding on a computer, comprising:
a display device configured to present video data; one or more processors communicatively coupled to the display device;
one or more memory stores communicatively coupled to the one or more processors;
a region-of-interest extraction logic module communicatively coupled to the one or more processors and configured to extract a region-of-interest pattern for a video picture, wherein the region-of-interest pattern is extracted based at least in part on a received depth map associated with the video picture and one or more received camera parameters, wherein the region-of-interest extraction logic module is further configured to:
determine a camera focal point based at least in part on the camera parameters,
determine a focal region unit based at least in part on the camera focal point, determine a characteristic focal depth value of the a focal region unit based at least in part on the depth map,
determine a region unit depth value for individual region units, and designate any region unit as being a region-of-interest or a region-of-non-interest of the region-of-interest pattern based at least in part on a comparison of the determined region unit depth values to the characteristic focal depth value, wherein the comparison includes comparing a difference between the determined region unit depth values and the characteristic focal depth value associated with the camera focal point to a threshold value;

a picture region-of-interest partition logic module communicatively coupled to the region-of-interest extraction logic module and configured to partition the video picture based at least in part on the extracted region-of-interest pattern, wherein the partitioned video picture comprises one or more regions-of-interest and one or more regions-of-non-interest; and a coder communicatively coupled to the picture region-of-interest partition logic module and configured to code the one or more regions-of-interest and the one or more regions-of-non-interest.

14. The system of claim 13, wherein the coder comprises a 3D decoder.

15. The system of claim 13, wherein the partitioning of the video picture, during encoding, comprises splitting the video picture into one or more regions-of-interest picture portions and one or more regions-of-non-interest picture portions.

16. The system of claim 13, wherein the partitioning of the video picture, during encoding, comprises assembling the video picture from one or more regions-of-interest picture portions and one or more regions-of-non-interest picture portions.

17. The system of claim 13, wherein the region-of-interest extraction logic module is further configured to:
 determine a checking window associated with a portion of the video picture based at least in part on the camera focal point, and
 designate any region unit located outside the checking window as being a region-of-non-interest of the region-of-interest pattern.

18. The system of claim 13, wherein the region-of-interest extraction logic module is further configured to:
 further designate region-of-interest region units of the region-of-interest pattern as belonging to two or more index types based at least in part on the comparison of the determined region unit depth values to the characteristic focal depth value.

19. The system of claim 13, wherein the region-of-interest extraction logic module is further configured to:
 determine a checking window associated with a portion of the video picture based at least in part on the camera focal point,
 designate any region unit located outside the checking window as being a region-of-non-interest of the region-of-interest pattern,
 determine the region unit depth value for individual region units located within the checking window,
 designate any region unit located within the checking window as being a region-of-interest or a region-of-non-interest of the region-of-interest pattern based at least in part on the comparison of the determined region unit depth values to the characteristic focal depth value, and
 further designate region-of-interest region units of the region-of-interest pattern as belonging to two or more index types based at least in part on the comparison of the determined region unit depth values to the characteristic focal depth value.

20. The system of claim 13, wherein, during coding, the one or more regions-of-non-interest picture portions are coded via a first standard different from a second standard applied to the one or more regions-of-interest picture portions.

21. The system of claim 13, wherein, during coding, the one or more regions-of-non-interest picture portions are coded via a first standard different from a second standard applied to the one or more regions-of-interest picture portions, and wherein the second standard comprises a first sub-standard applied to a first index type of the one or more regions-of-interest picture portions and a second sub-standard applied to a second index type of the one or more regions-of-interest picture portions; and
 wherein the first standard, the second standard, the first sub-standard and/or the second sub-standard differ based at least in part on one or more of the following criteria: different coding tools, different constraints, and different coding strategies; wherein the different coding tools differ based at least in part on one or more of the following criteria: application of lossless verses lossy coding to different regions and application of integer motion compensation verses fractional motion compensation to different regions; wherein the different constraints differ based at least in part on one or more of the following criteria: application of different reference picture number limitations to different regions and application of different prediction and transform sizes to different regions; and wherein the different coding strategies differ based at least in part on one or more of the following criteria: application of different search ranges for motion estimation to different regions and application of different quantization parameters to different regions.

22. The system of claim 13, wherein the picture region-of-interest partition logic module is further configured to:
 differentiate between a first type of region unit and a second type of region unit different from the first type, wherein the first and second type of region unit differ base on one or more of the following criteria: a slice-level criterion, a picture level criterion, and a view level criterion; and
 selectively partition the video picture based at least in part on the type of region unit.

23. The system of claim 13, further comprising: wherein the extraction of the region-of-interest pattern logic module is further configured to:
 determine a checking window associated with a portion of the video picture based at least in part on the camera focal point,
 designate any region unit located outside the checking window as being a region-of-non-interest of the region-of-interest pattern,
 determine the region unit depth value for individual region units located within the checking window,
 designate any region unit located within the checking window as being a region-of-interest or a region-of-non-interest of the region-of-interest pattern based at least in part on the comparison of the determined region unit depth values to the characteristic focal depth value, and
 further designate region-of-interest region units of the region-of-interest pattern as belonging to two or more index types based at least in part on the comparison of the determined region unit depth values to the characteristic focal depth value; wherein the picture region-of-interest partition logic module is further configured to:
 differentiate between a first type of region unit and a second type of region unit different from the first type, wherein the first and second type of region unit differ base on one or more of the following criteria: a slice-level criterion, a picture level criterion, and a view level criterion, selectively partition the video picture based at least in part on the type of region unit based at least in part on one or more of the following criteria: application of partitioning verses no application of partitioning, application of different region unit sizes, application of different checking window sizes, and application of different thresholds associated with the comparison of the determined region unit depth values to the characteristic focal depth value, and wherein the partitioning of the video picture, during encoding, comprises splitting the video picture into one or more regions-of-interest picture portions and one or more regions-of-non-interest picture portions based at least in part on the region-of-interest pattern; and wherein the partitioning of the video picture, during decoding, comprises assembling the video picture from one or more regions-of-interest picture portions and one or more regions-of-non-interest picture portions;

wherein, during coding, the one or more regions-of-non-interest picture portions are coded via a first standard different from a second standard applied to the one or more regions-of-interest picture portions, and wherein the second standard comprises a first sub-standard applied to a first index type of the one or more regions-of-interest picture portions and a second sub-standard applied to a second index type of the one or more regions-of-interest picture portions; and wherein the first standard, the second standard, the first sub-standard and/or the second sub-standard differ based at least in part on one or more of the following criteria: different coding tools, different constraints, and different coding strategies; wherein the different coding tools differ based at least in part on one or more of the following criteria: application of lossless verses lossy coding to different regions and application of integer motion compensation verses fractional motion compensation to different regions; wherein the different constraints differ based at least in part on one or more of the following criteria: application of different reference picture number limitations to different regions and application of different prediction and transform sizes to different regions; and wherein the different coding strategies differ based at least in part on one or more of the following criteria: application of different search ranges for motion estimation to different regions and application of different quantization parameters to different regions.

* * * * *